United States Patent
Kwon et al.

(10) Patent No.: US 9,942,887 B2
(45) Date of Patent: Apr. 10, 2018

(54) SYSTEM AND METHOD FOR DOWNLINK TRANSMISSION IN A WIRELESS NETWORK

(71) Applicant: FutureWei Technologies, Inc., Plano, TX (US)

(72) Inventors: Young Hoon Kwon, San Diego, CA (US); Yunsong Yang, Schaumburg, IL (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 442 days.

(21) Appl. No.: 13/798,472

(22) Filed: Mar. 13, 2013

(65) Prior Publication Data

US 2013/0272137 A1    Oct. 17, 2013

Related U.S. Application Data

(60) Provisional application No. 61/623,418, filed on Apr. 12, 2012.

(51) Int. Cl.
*H04W 72/04* (2009.01)
*H04L 27/26* (2006.01)
(Continued)

(52) U.S. Cl.
CPC ......... *H04W 72/042* (2013.01); *H04L 1/1829* (2013.01); *H04L 27/261* (2013.01);
(Continued)

(58) Field of Classification Search
CPC ............. H04L 41/0213; H04L 41/0806; H04L 41/0886; H04L 12/4633; H04W 24/02;
(Continued)

(56) References Cited

U.S. PATENT DOCUMENTS

| | | | |
|---|---|---|---|
| 2005/0141543 A1 | 6/2005 | Nishimura | |
| 2012/0093052 A1* | 4/2012 | Kang et al. | 370/311 |

(Continued)

FOREIGN PATENT DOCUMENTS

| | | |
|---|---|---|
| CN | 1387344 A | 12/2002 |
| CN | 1638309 A | 7/2005 |

(Continued)

OTHER PUBLICATIONS

PCT International Search Report and Written Opinion for PCT/CN2013/074143, Applicant: Huawei Technologies Co., LTD., dated Jul. 25, 2013, 10 pages.

(Continued)

*Primary Examiner* — Jung-Jen Liu
(74) *Attorney, Agent, or Firm* — Slater Matsil, LLP (57) ABSTRACT

A method of communicating in a wireless network includes transmitting, by a station, a null data packet (NDP) power save (PS)-Poll frame including a short training field and a long training field. Also, the NDP PS-Poll frame includes a signaling field including a message type indicator, a transmitter address (TA), a receiver address (RA), and a cyclic redundancy check (CRC). Additionally, the method includes receiving, by the station, buffered data in accordance with the NDP PS-Poll frame.

34 Claims, 10 Drawing Sheets

(51) Int. Cl.
*H04L 1/18* (2006.01)
*H04W 74/04* (2009.01)
*H04L 5/00* (2006.01)
*H04L 1/00* (2006.01)
*H04W 52/02* (2009.01)
*H04W 74/00* (2009.01)

(52) U.S. Cl.
CPC ........... *H04W 74/04* (2013.01); *H04L 1/0003* (2013.01); *H04L 1/0009* (2013.01); *H04L 1/0025* (2013.01); *H04L 5/0007* (2013.01); *H04L 5/0048* (2013.01); *H04W 52/0216* (2013.01); *H04W 74/002* (2013.01); *Y02B 60/50* (2013.01)

(58) Field of Classification Search
CPC .. H04W 60/04; H04W 52/46; H04B 17/0057; H04B 7/022
USPC ........ 370/203, 204–215, 229–240, 310–337, 370/338–350, 351–394, 395.1, 395.3, 370/395.4, 395.41, 395.42, 395.5, 395.52, 370/431–457, 458–463, 464–497, 370/498–522, 523–520, 521–529
See application file for complete search history.

(56) References Cited

U.S. PATENT DOCUMENTS

2012/0230273 A1* 9/2012 He et al. ............... 370/329
2012/0314696 A1* 12/2012 Liu ....................... 370/338
2013/0170345 A1* 7/2013 Merlin et al. .......... 370/230
2013/0279381 A1* 10/2013 Sampath et al. ....... 370/311
2013/0329620 A1* 12/2013 Kim et al. .............. 370/311

FOREIGN PATENT DOCUMENTS

EP 2809110 A1 12/2014
EP 2811790 A1 12/2014
WO 2007002363 A2 1/2007

OTHER PUBLICATIONS

"IEEE Standard for Information technology—Telecommunications and information exchange between systems—Local and metropolitan area networks—Specific requirements, Part 11: Wireless LAN Medium Access Control (MAC) and Physical Layer (PHY) Specification," IEEE Std 802.11™-2007 (Revision of IEEE Std 802.11—1999) IEEE Compuer Society, Sponsored by the LAN/MAN Standards Committee, Jun. 12, 2007, 1232 pages.
Liu, Y., et al., "Short Ack Frame," 20111024tr0 Marvell Short Ack Frame, Extend Submission, Oct. 24, 2011, 5 pages.
Park, M., et al., "AP Assisted Medium Synchronization," IEEE 802.11-12/0840r1, Submission, Sep. 2012, 16 pages.
Extended European Search Report for Application No. 13775871.0; dated Apr. 22, 2015, 7 pages.
Ghosh, C., et al., "PS-Poll Enhancements," IEEE 802.11-12/0328r0, Mar. 12, 2012, pp. 1-15.
Kwon, Y.H., et al., "NDP Type PS-Poll Frame," IEEE 802.11-12/0848r0, Jul. 16, 2012, pp. 1-16.

* cited by examiner

| Field | Bit width |
|---|---|
| Message type indicator | 4 |
| TA | 9 |
| RA | 9 |
| Preferred MCS | 4 |
| Tail bits | 6 |
| CRC | 4 |
| TOTAL | 36 |

SYSTEM AND METHOD FOR DOWNLINK TRANSMISSION IN A WIRELESS NETWORK

This application claims the benefit of U.S. Provisional Application No. 61/623,418 filed Apr. 12, 2012, entitled "System and Method for Transmitting a Reference Signal," which is incorporated herein by reference as if reproduced in its entirety.

TECHNICAL FIELD

The present invention relates to a system and method for wireless communications, and, in particular, to a system and method for downlink transmission in a wireless network.

BACKGROUND

Currently, IEEE 802.11ah defines a local area network protocol especially for sub 1 GHz carrier frequencies. The main requirements of IEEE 802.11ah include a large coverage area (e.g., up to 1 km), a physical (PHY) layer data rate of at least 100 kbps, a maximum aggregate multi-station data rate of 20 Mbps, the use of orthogonal frequency division multiplexing (OFDM) PHY modulation, and support of a number of associations beyond 2007 for outdoor applications.

Overhead is an issue under the 802.11ah protocol. The physical layer of 802.11ah uses a slower clock than that used in the normal 802.11 protocol. Therefore, each symbol length under 802.11ah is ten times as long as under the normal 802.11 protocol.

For a downlink traffic transmission scheme in the 802.11 protocol, at every beacon frame, an access point (AP) broadcasts a traffic indication map (TIM) that has information on whether the downlink packet is buffered to each of the stations. If the downlink packet is buffered, a station, after reading the TIM, transmits a power save (PS)-Poll message indicating that the station is awakened and ready to receive downlink data packet. If the access point is ready to transmit buffered data, the access point immediately transmits downlink data packets. If the access point is not ready to transmit buffered data, the access point transmits an acknowledgment packet, and the access point will transmit the buffered data shortly.

SUMMARY

An embodiment method of communicating in a wireless network includes transmitting, by a station, a null data packet (NDP) power save (PS)-Poll frame including a short training field and a long training field. Also, the NDP PS-Poll frame includes a signaling field including a message type indicator, a transmitter address (TA), a receiver address (RA), and a cyclic redundancy check (CRC). Additionally, the method includes receiving, by the station, buffered data in accordance with the NDP PS-Poll frame.

An embodiment method of communicating in a wireless network includes receiving, by an access point, a null data packet (NDP) PS-Poll frame including a short training field and a long training field. Also, the NDP PS-Poll frame includes a signaling field including a message type indicator, a receiver address (RA), a transmitter address (TA), and a cyclic redundancy check (CRC). Additionally, the method includes decoding, by the access point, the NDP PS-Poll frame and transmitting, by the access point, buffered data in accordance with the NDP PS-Poll frame.

An embodiment station includes a processor and a computer readable storage medium storing programming for execution by the processor. The programming includes instructions to transmit a null data packet (NDP) PS-Poll frame including a short training field and a long training field. Also, the NDP PS-Poll frame includes a signaling field including a message type indicator, a receiver address (RA), a transmitter address (TA), and a cyclic redundancy check (CRC). Additionally, the programming includes instructions to receive buffered data in accordance with the NDP PS-Poll frame.

An embodiment access point includes a processor and a computer readable storage medium storing programming for execution by the processor. The programming includes instructions to receive a null data packet (NDP) PS-Poll frame including a short training field and a long training field. Also, the NDP PS-Poll frame includes a signaling field including a message type indicator, a receiver address (RA), a transmitter address (TA), and a cyclic redundancy check (CRC). Additionally, the programming includes instructions to decode the null data packet and transmit buffered data in accordance with the NDP PS-Poll frame.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For a downlink traffic transmission scheme in the 802.11 protocol, at every beacon frame, an access point (AP) broadcasts a traffic indication map (TIM) that has information on whether the access point has buffered downlink packets for each station that is associated with the access point. If the access point has buffered downlink packets for the station, after receiving the TIM information, the station transmits a power save (PS)-Poll frame indicating that the station is in an active state and ready to receive buffered downlink data packets. If the access point is ready to transmit buffered data, it directly transmits downlink data packets. However, if the access point is not ready to transmit buffered data, the access point transmits an acknowledgment packet to the station, and the access point transmits the buffered data packets to the station shortly thereafter.

Figure 1:
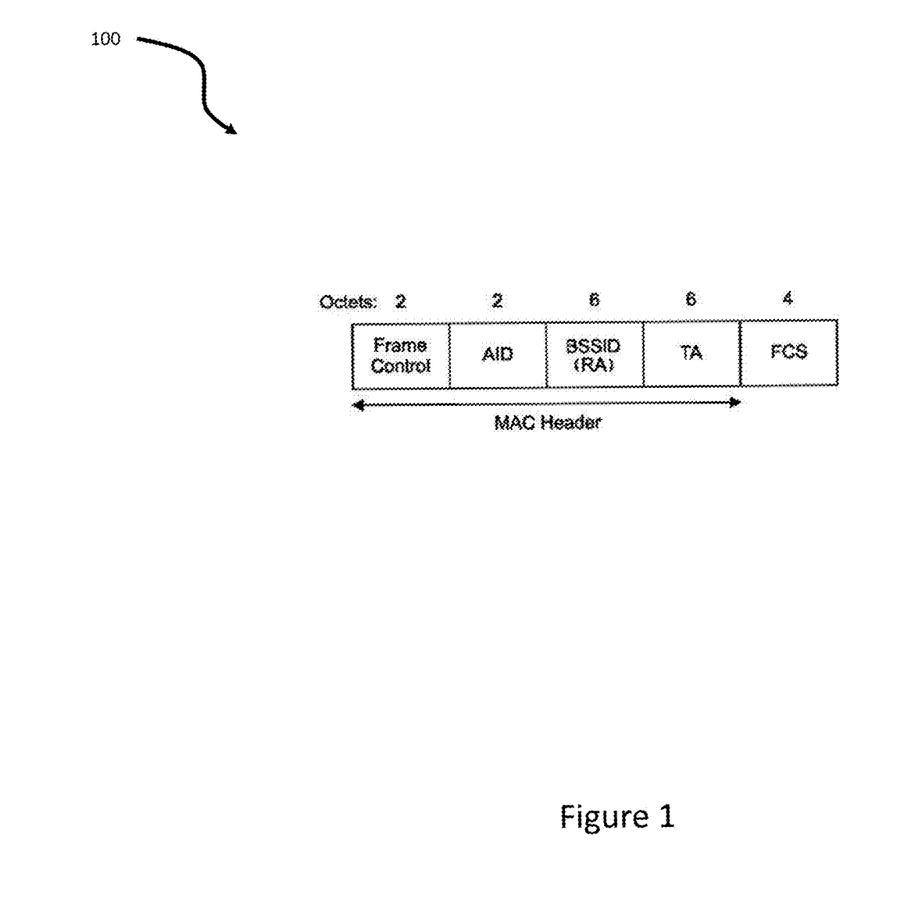
FIG. 1 illustrates a power save (PS)-Poll message format.

FIG. 1 illustrates a PS-Poll frame 100 that is configured to indicate that a station is in an active state and is ready to receive buffered data. The PS-Poll frame 100 includes two octets for frame control, two octets for an association identification number (AID), six octets for a basic service set identification number (BSSID), six octets for a transmitter address (TA), and four octets for a frame check sequence (FCS). Hence the PS-Poll frame 100 contains 20 octets. The BSSID may be the receiver address (RA). The media access control (MAC) header of the PS-Poll frame 100 includes the frame control, the AID, the BSSID, and the TA. Additionally, the PS-poll frame 100 contains a short training field, a long training field, and a signaling field. (not pictured)

Figure 2:
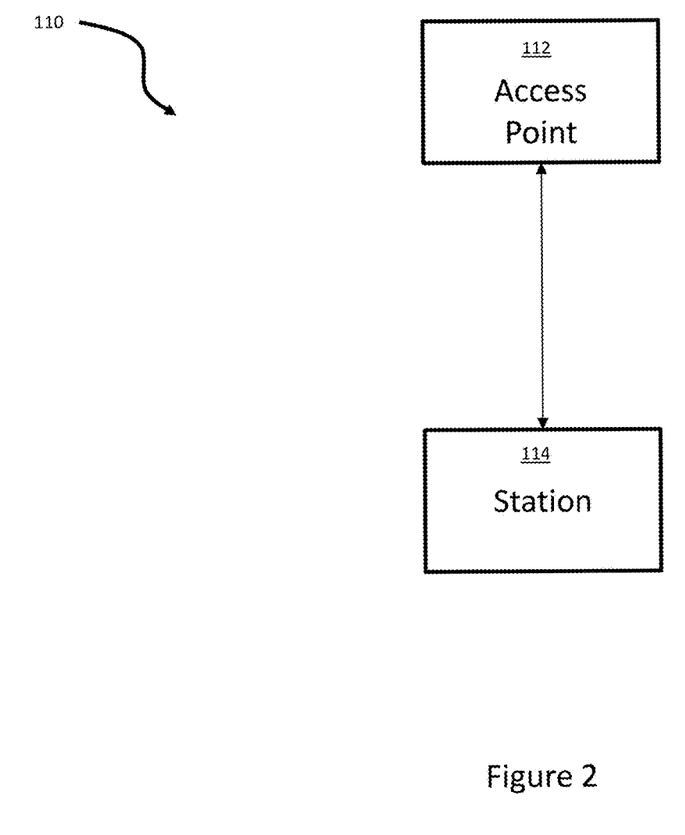
FIG. 2 illustrates an embodiment system for downlink transmission in a wireless network.

FIG. 2 illustrates system 110 for downlink data transmission in a wireless network. System 110 includes access point 112 and station 114. Access point 112 initially broadcasts a TIM. Then, station 114 responds by transmitting a null data packet (NDP) PS-Poll frame to the access point. An NDP is a physical layer convergence procedure (PLCP) protocol data unit (PPDU) that carries no data field. Thus, an NDP packet may be a physical layer header only packet that carries no data field. The NDP may have a fixed packet length and modulation and coding scheme (MCS) level, and may be encoded in the lowest available MCS level. Next, access point 112 decodes the NDP PS-Poll frame. If access point 112 is ready to transmit buffered data to station 114, access point 112 immediately begins transmitting buffered data to station 114. However, if access point 112 is not immediately ready to transmit data, access point 112 transmits an acknowledgment frame to station 114, and access point 112 transmits the buffered data to station 114 when access point 112 is ready.

Figure 3:
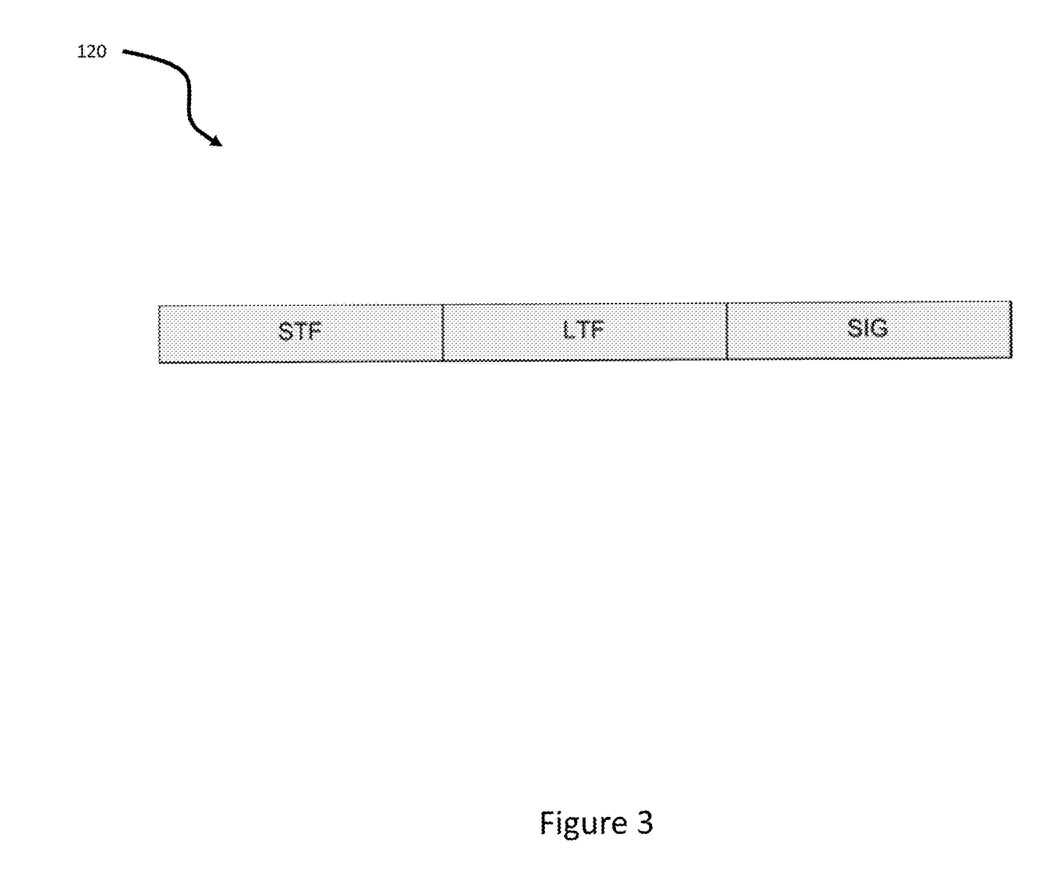
FIG. 3 illustrates an embodiment physical layer header.

An example of packet 120 that may be used as an NDP PS-Poll frame is illustrated in FIG. 3. In an example, the packet 120 may consist of only a physical (PHY) layer preamble. The packet 120 may include a short training field (STF), a long training field (LTF), and a signaling field (SIG). The short training field is used for initial frame synchronization, for coarse frequency offset compensation, and for automatic gain control (AGC) settings. Additionally, the long training field is used for fine frequency offset compensation and channel estimation. In an example, the lowest modulation and coding scheme (MCS) level is used to transmit the NDP PS-Poll frame. The NDP PS-Poll frame may be delivered using the physical layer header field of an IEEE 802.11 packet format.

Figure 4:
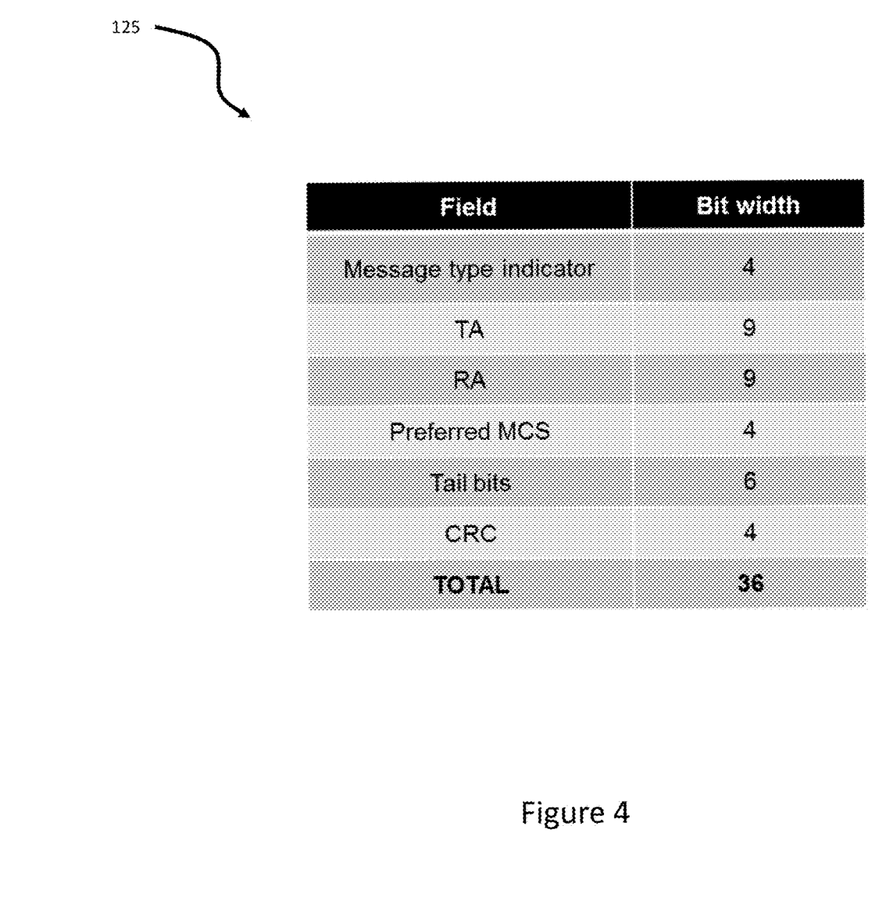
FIG. 4 illustrates an embodiment signaling field allocation for a short PS-Poll packet.

FIG. 4 illustrates an embodiment signaling field of an NDP PS-Poll frame 125. The signaling field may include four bits for a message type indicator, nine bits for a transmitter address (TA) or the address of the station, nine bits for a receiver address (RA) or the address of the access point, four bits for a preferred modulation and coding scheme (MCS) subfield, six bits for tail bits for Viterbi decoding, and four bits for a cyclic redundancy check (CRC). In one example, the signaling field also includes one bit for a message type indicator and one reserved bit, for a total of 36 bits. In another example, the signaling field also includes nine bits for a message type indicator and three reserved bits for a total of 48 bits. The preferred modulation and coding scheme (MCS) subfield for downlink data packets indicates the preferred MCS level. Also, a preferred number of concurrent streams for downlink data packet transmission may be included in the signaling field of an NDP PS-Poll frame 125.

In an example, the signaling field has 48 bits or fewer bits. In another example, the signaling field has 36 bits or fewer. In one embodiment, the signaling field contains an uplink data indicator, a transmitter address, a receiver address, and a cyclic redundancy check (CRC). In another embodiment, the signaling field additionally contains a preferred MCS subfield indicating the preferred MCS for downlink data packets. In one example, the preferred MCS subfield is based on the quality of previous packets broadcast by the access point. Also, the signaling field may include decoder tail bits for Viterbi-decoding. In an example, the lowest MCS level is used to transmit the NDP PS-Poll frame. In another example, field indicating a preferred number of concurrent streams for downlink data packet transmission is included in an NDP PS-Poll frame. The NDP PS-Poll frame may be delivered using the physical layer header field of an IEEE 802.11 packet format. In one example, the transmitter address is generated by a function including at least a portion of the AID. Both the station and the access point know how the transmitter address is generated from the original AID. In another example, the receiver address is generated by a function including at least portion of the BSSID of the access point. The station and the access point may know how the receiver address is generated from the original BSSID.

Figure 5:
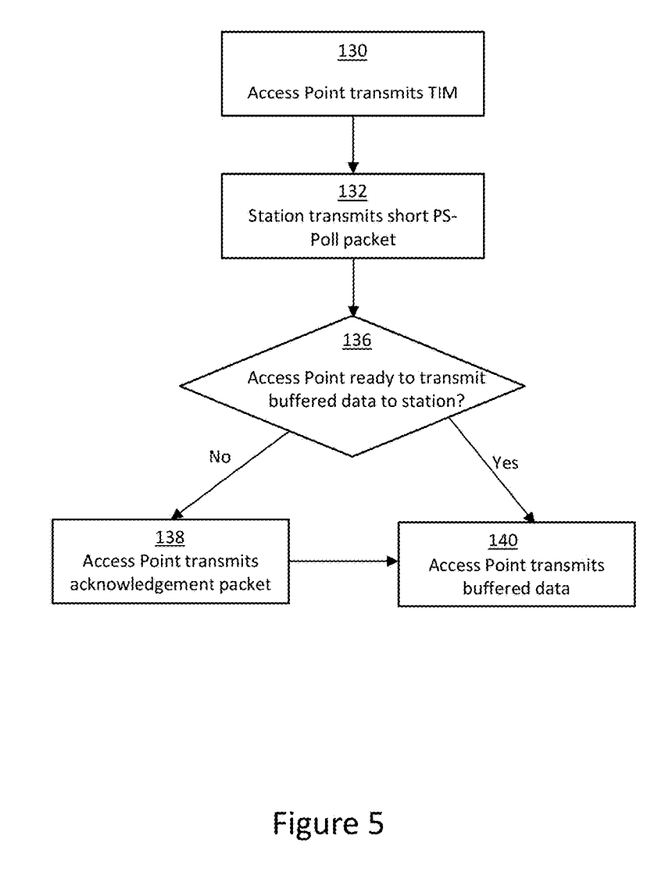
FIG. 5 illustrates a flowchart of an embodiment method for downlink transmission in a wireless network.

A method of downlink transmission from an access point to a station is illustrated in FIG. 5. Initially, in step 130, the access point broadcasts a TIM. After receiving the TIM, if the station is in an active state and ready to receive buffered data, in step 132, the station transmits an NDP PS-Poll frame to the access point. Upon receiving the NDP PS-Poll frame, the access point decodes the NDP PS-Poll frame, and, in step 136, the access point determines if the access point is ready to transmit buffered data to the station. If the access point is ready to transmit buffered data, the access point, in step 140, immediately transmits buffered data to the station. If the access point is not ready to transmit buffered data, the access point, in step 138, transmits an acknowledgment frame to the station. Then, in step 140, the access point transmits buffered data to the station when the access point is ready. In an example, the partial virtual bitmap information in the IEEE 802.11 standard is used as the information of downlink traffic buffered at the access point.

Figure 6:
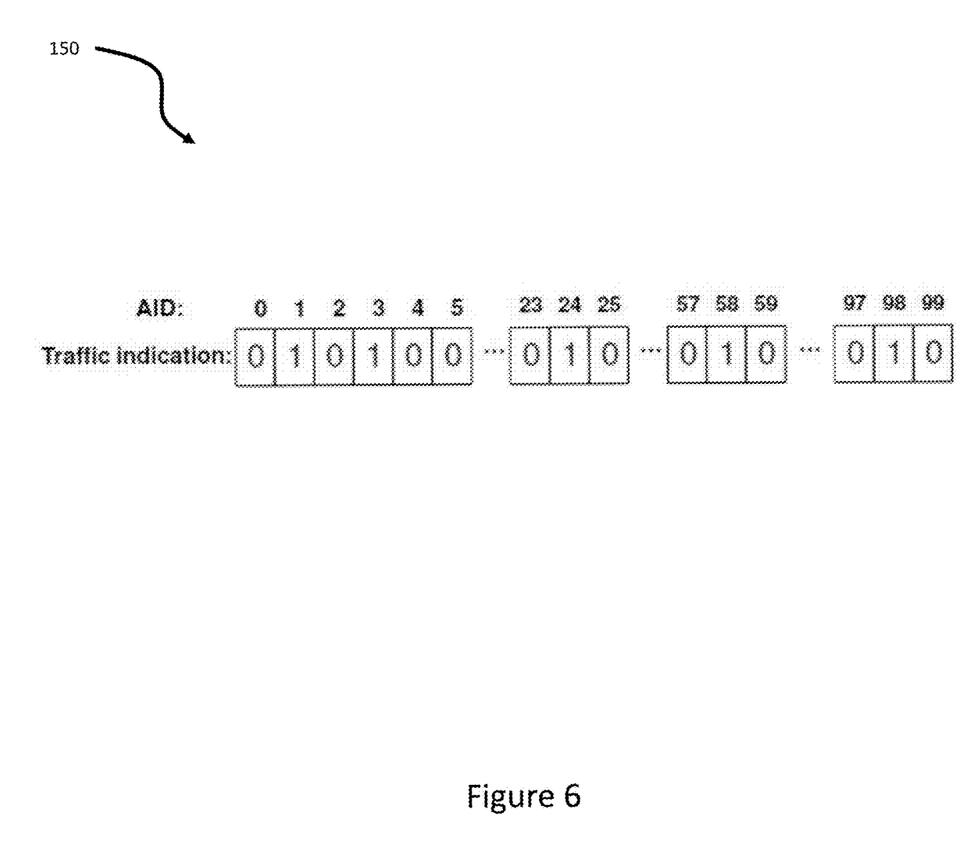
FIG. 6 illustrates an embodiment traffic indication map.

An access point broadcasts a TIM indicating stations to which the access point is prepared to deliver buffered data. For example, out of 1024 stations that are associated with the access points, the access point may be prepared to send buffered data to only 16 stations. When an NDP PS-Poll frame is used only in response to a TIM, an identifier needs to distinguish the 16 stations that the access point is prepared to send buffered data. For example, when the access point is prepared to send buffered data to 16 out of 1024 stations, the identifier may consist of only four bits to identify the 16 stations, not the 10 bits required to identify the 1024 stations, which is used to identify the station in an NDP PS-Poll frame. FIG. 6 illustrates TIM 150 having 100 stations, where the access point is prepared to send buffered data to five stations. In TIM 150, the stations have AIDs ranging from 0 to 99. A "1" for traffic indication means that data in the access point is buffered for this station, while a "0" for traffic indication means that there is no data in the access point buffered for this station. In TIM 150, there are five stations that the access point has buffered data to deliver. The transmitter address used in an NDP PS-Poll frame sent by station 1 may be N ($0 \leq N \leq 4$), the transmitter address used in an NDP PS-Poll frame sent by station 3 may be mod (N+1, 5), the transmitter address used in an NDP PS-Poll frame sent by station 24 may be mod (N+2, 5), the transmitter address used in an NDP PS-Poll frame sent by station 58 may be mod (N+3, 5), and the transmitter address used in an NDP PS-Poll frame sent by station 98 may be mod (N+4, 5), where N is an offset value and mod is the modulo operation. In one example, N is equal to zero. Alternatively, N may be a random offset used so every station has an equal opportunity to get the first address.

Figure 7:
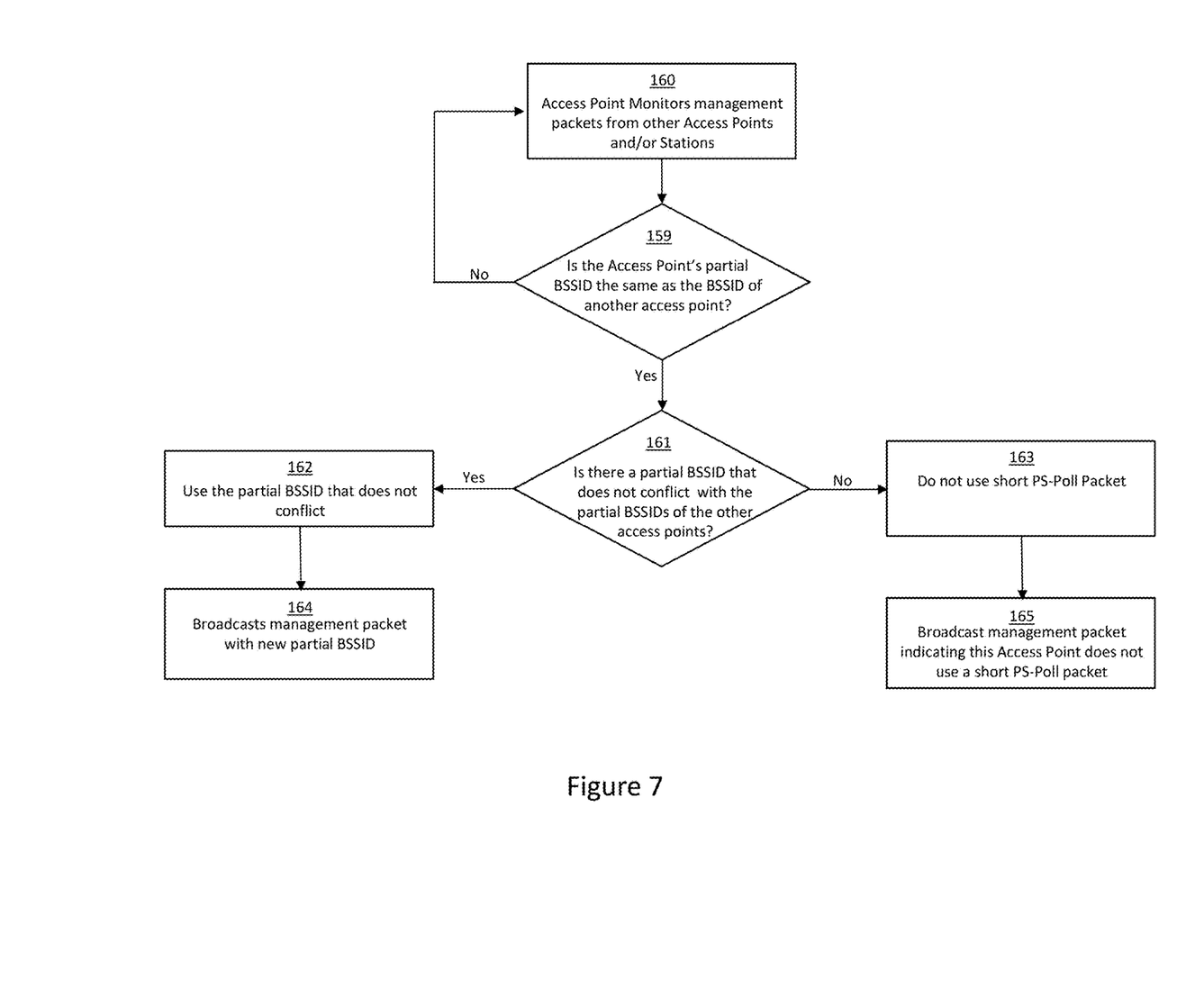
FIG. 7 illustrates a flowchart of an embodiment method of determining a receiver address.

When only a portion of BSSID is used as the receiver address in an NDP PS-Poll frame, it is possible that multiple access points use the same partial BSSID. FIG. 7 illustrates a method of determining a partial BSSID by an access point to avoid using the same partial BSSID as another access point. Initially, in step 160, the access point continuously monitors management packets from other access points to determine the partial BSSIDs used by other access points. For example, the management packets may be a beacon frame, a probe response frame, or an association response frame in the IEEE 802.11 protocol. Also, stations may report the partial BSSIDs used by nearby access points to the access point. In step 159, the access point determines whether another access point uses the same partial BSSID as it. If the access point's partial BSSID is not the same as the BSSID of another access point, the system returns to step 160 for further monitoring. However, if the access point's partial BSSID is the same as the partial BSSID of another access point, the system proceeds to step 161, where it determines if there is a partial BSSID that does not conflict with the partial BSSID of another accesses point. If there is a partial BSSID that does not conflict with the partial BSSIDs used by other access points, the access point, in step 162, sets its partial BSSID to that partial BSSID. Then, in step 164, the access point broadcasts management packets, such as beacon frames, probe response frames, or association response frames. The management packet indicates that, if the access point uses another partial BSSID, the access point does not follow the general rule for extracting partial BSSID. The management packet also may include the partial BSSID used by the access point. However, if there is not another partial BSSID that does not conflict with the partial BSSIDs used by other access points, the access point, in step 163, determines that the access point will not use an NDP PS-Poll frame. Then, in step 165, the access point broadcasts a management packet that indicates that the use of NDP PS-Poll frames is disabled by this access point.

Figure 8:
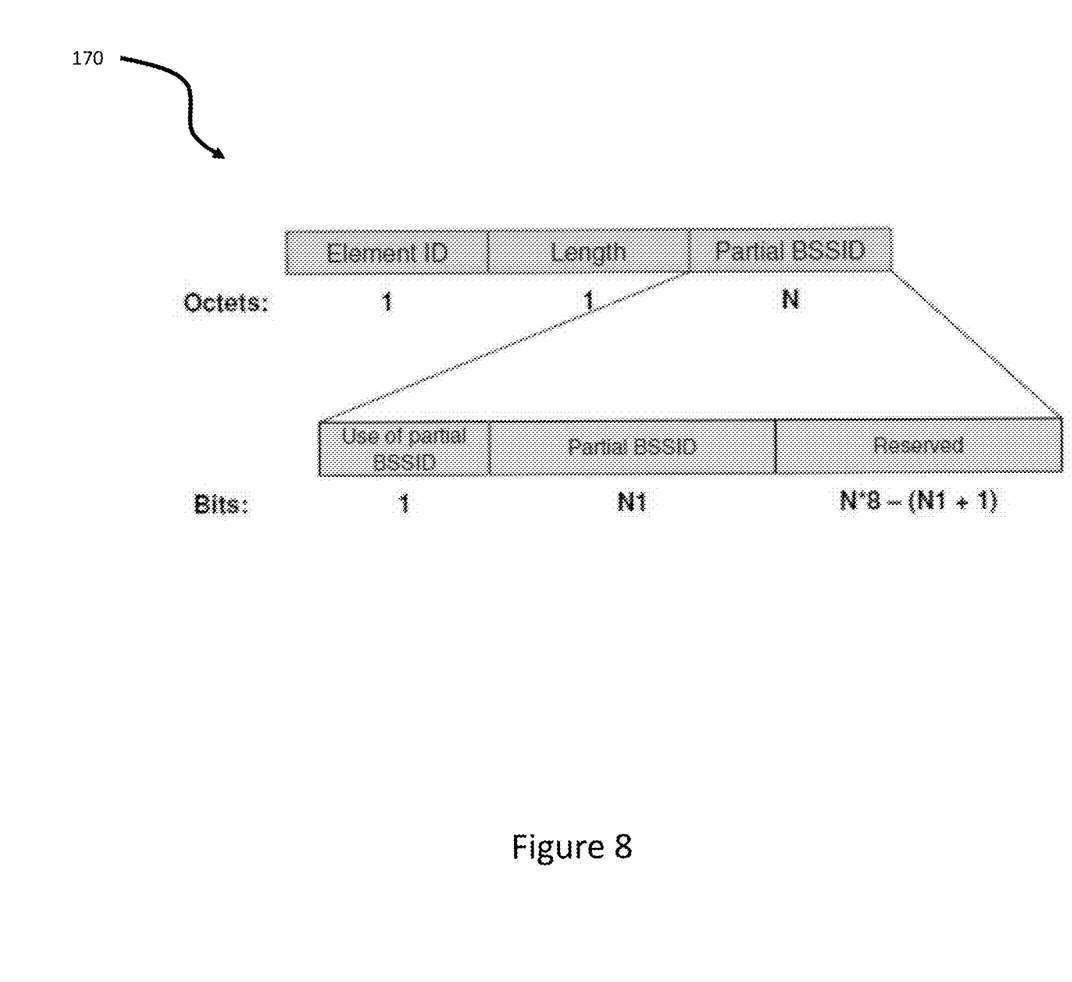
FIG. 8 illustrates an embodiment receiver address.

A partial BSSID information element 170 that may be broadcast on a beacon frame by an access point is illustrated in FIG. 8. In one example, the partial BSSID information element 170 includes one octet for an element ID, one octet for a length field, and N octets for a partial BSSID. The partial BSSID may include 1 bit to indicate whether or not a partial BSSID is used, where a "1" indicates the uses of a partial BSSID in the following field, and a "0" indicates that the access point does not use a partial BSSID, or vice versa. In an example, the inclusion of the partial BSSID in the beacon frame indicates that the access point does not use the standard method of extracting partial BSSIDs. The partial BSSID is N1 bits, while there are N*8−(N1+1) reserved bits. In one example, N1 is equal to nine, N is equal to 2, and there are six reserved bits.

Figure 9:
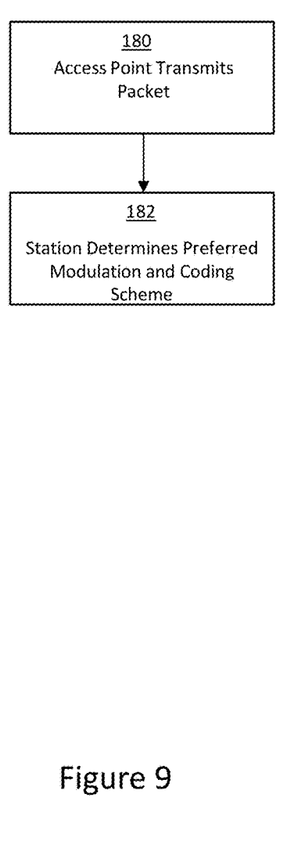
FIG. 9 illustrates a flowchart of an embodiment method of determining a modulation and coding scheme.

FIG. 9 illustrates a flowchart of a method where a station determines a preferred MCS level for the buffered data. Initially, in step 180, an access point transmits a packet, such as a beacon frame, a probe response frame, or an association response frame. Then, in step 182, the station determines the preferred MCS level of the access point, for example based on the signal quality of the received packet from the access point. The preferred MCS level may be indicated in a preferred modulation and coding field of an NDP PS-poll frame. In one example, the absolute preferred MCS level is indicated. In another example, a portion of the bits for the preferred MCS level is included in the NDP PS-Poll frame. Alternatively, a differential MCS level might be included in the NDP PS-Poll frame, where the differential MCS level indicates the level difference between the preferred MCS level and the MCS level of the previous successfully received downlink transmission.

Figure 10:
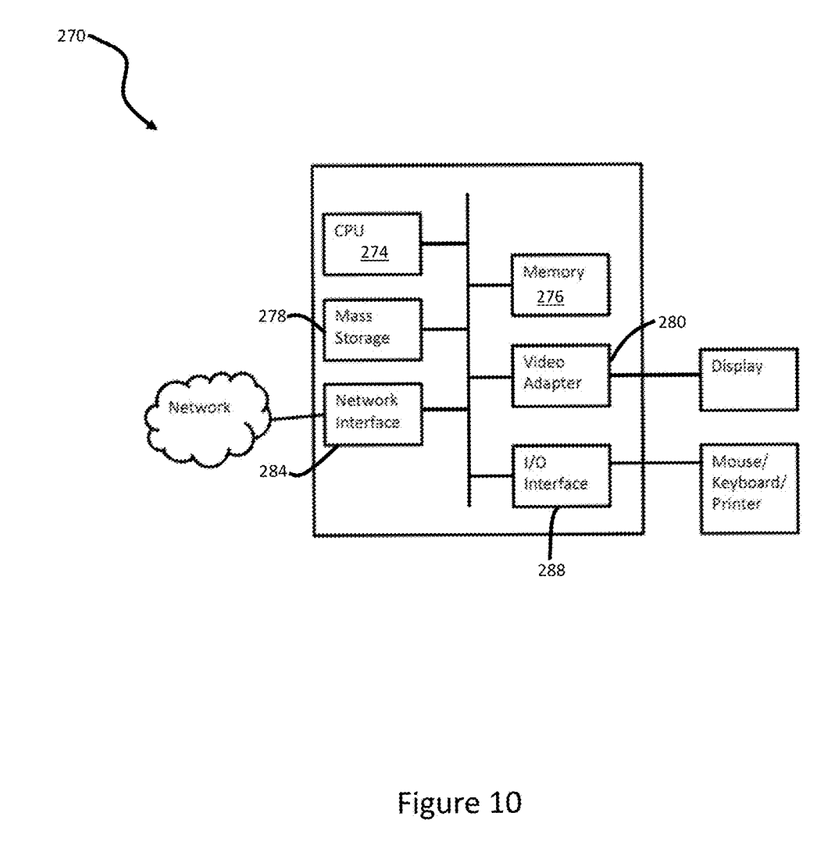
FIG. 10 illustrates a block diagram illustrating computing platform that may be used for implementing, for example, the devices and methods described herein, in accordance with an embodiment.

FIG. 10 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantages of an embodiment include using fewer bits for NDP PS-poll frames.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of communicating in a wireless network, the method comprising:
   transmitting, by a station to an access point (AP), a null data packet (NDP) power save (PS)-Poll frame comprising
      a short training field (STF),
      a long training field (LTF), and
      a signaling (SIG) field comprising
         a message type indicator,
         a transmitter address (TA),
         a receiver address (RA),
         a preferred modulation and coding scheme (MCS), wherein the preferred MCS is recommended to the AP for downlink transmission, and
         an uplink data indicator (UDI); and
   receiving, by the station, buffered data in accordance with the NDP PS-Poll frame.

2. The method of claim 1, further comprising decoding the received buffered data using the preferred MCS.

3. The method of claim 1, wherein the preferred MCS comprises a direct indicator of a modulation and coding scheme level.

4. The method of claim 1, further comprising:
   receiving, by the station, a packet from an access point; and
   determining the preferred MCS in accordance with a quality of the packet.

5. The method of claim 1, wherein the SIG field further comprises tail bits.

6. The method of claim 1, further comprising receiving, by the station, a traffic indication map.

7. The method of claim 1, further comprising receiving, by the station, an acknowledgment frame prior to receiving the buffered data.

8. The method of claim 1, wherein the SIG field is fewer than 49 bits.

9. The method of claim 8, wherein the SIG field is fewer than 37 bits.

10. The method of claim 1, wherein the TA is generated in accordance with a portion of an association ID (AID).

11. The method of claim 1, wherein the RA is generated in accordance with a portion of a basic service set ID (BSSID).

12. The method of claim 1, wherein the RA has nine bits.

13. The method of claim 1, wherein the TA has nine bits.

14. The method of claim 1, wherein the SIG further comprises a cyclic redundancy check (CRC).

15. A method of communicating in a wireless network, the method comprising:
   receiving, by an access point (AP), a null data packet (NDP) PS-Poll frame comprising
      a short training field (STF),
      a long training field (LTF), and
      a signaling (SIG) field comprising
         a message type indicator,
         a receiver address (RA),
         a transmitter address (TA),
         a preferred modulation and coding scheme (MCS), and
         an uplink data indicator (UDI);
   decoding, by the AP, the NDP PS-Poll frame;
   determining a selected MCS in accordance with the preferred MCS;
   encoding buffered data in accordance with the selected MCS to produce encoded buffered data; and
   transmitting, by the AP, the encoded buffered data in accordance with the NDP PS-Poll frame.

16. The method of claim 15, wherein a plurality of stations has a plurality of addresses, wherein the plurality of stations is configured to receive buffered data from the AP, and wherein the TA is different than the plurality of addresses of the plurality of stations.

17. The method of claim 15, further comprising:
   monitoring, by the AP, packets from a plurality of APs having a plurality of receiver addresses;
   changing the receiver address when the receiver address matches one of the plurality of receiver addresses; and
   broadcasting a management packet, by the AP, wherein the management packet comprises a code indicating whether the receiver address is generated in accordance with a portion of a basic service set ID (BSSID).

18. The method of claim 15, wherein encoding the buffered data in accordance with the selected MCS comprises encoding the buffered data using the preferred MCS.

19. The method of claim 15, further comprising broadcasting, by the AP, information indicating a presence of downlink traffic buffered at the AP.

20. The method of claim 15, further comprising transmitting, by the AP, a traffic indication map.

21. The method of claim 15, further comprising transmitting, by the AP, an acknowledgment frame prior to transmitting the encoded buffered data.

22. The method of claim 21, wherein the SIG field is fewer than 49 bits.

23. The method of claim 15, wherein the RA has nine bits.

24. The method of claim 15, wherein the TA has nine bits.

25. The method of claim 15, wherein the preferred MCS comprises a direct indicator of a modulation and coding level.

26. The method of claim 15, wherein the SIG field is fewer than 37 bits.

27. A station comprising:
a processor; and
a non-transitory computer readable storage medium storing programming for execution by the processor, the programming including instructions to
transmit, to an access point (AP), a null data packet (NDP) PS-Poll frame comprising
a short training field (STF),
a long training field (LTF), and
a signaling (SIG) field comprising
a message type indicator,
a receiver address (RA),
a transmitter address (TA),
a preferred modulation and coding scheme (MCS), wherein the preferred MCS is recommended to the AP for downlink transmission, and
an uplink data indicator (UDI), and
receive buffered data in accordance with the NDP PS-Poll frame.

28. The station of claim 27, wherein the SIG field is fewer than 49 bits.

29. An access point (AP) comprising:
a processor; and
a non-transitory computer readable storage medium storing programming for execution by the processor, the programming including instructions to
receive a null data packet (NDP) PS-Poll frame comprising
a short training field (STF),
a long training field (LTF), and
a signaling (SIG) field comprising
a message type indicator,
a receiver address (RA),
a transmitter address (TA),
a preferred modulation and coding scheme (MCS), and
an uplink data indicator (UDI),
decode the null data packet,
determine a selected MCS in accordance with the preferred MCS,
encode buffered data in accordance with the selected MCS to produce encoded buffered data, and
transmit the encoded buffered data in accordance with the NDP PS-Poll frame.

30. The AP of claim 29, wherein the SIG field is fewer than 49 bits.

31. The AP of claim 29, wherein the SIG field is fewer than 37 bits.

32. The AP of claim 29, wherein the RA has nine bits and the TA has nine bits.

33. The station of claim 27, wherein the SIG field is fewer than 37 bits.

34. The station of claim 27, wherein the RA has nine bits and the TA has nine bits.

* * * * *